US009465841B2

(12) United States Patent
Salch et al.

(10) Patent No.: US 9,465,841 B2
(45) Date of Patent: Oct. 11, 2016

(54) REAL-TIME SECURITY MODEL PROVIDING INTERMEDIATE QUERY RESULTS TO A USER IN A FEDERATED DATA SYSTEM

(71) Applicant: CIRRO, INC., San Juan Capistrano, CA (US)

(72) Inventors: David Herbert Salch, White City, OR (US); Brian Christopher Jew, Laguna Hills, CA (US); Mark Robert Theissen, Orange, CA (US)

(73) Assignee: CIRRO, INC., San Juan Capistrano, CA (US)

( * ) Notice: Subject to any disclaimer, the term of this patent is extended or adjusted under 35 U.S.C. 154(b) by 81 days.

(21) Appl. No.: 13/631,718

(22) Filed: Sep. 28, 2012

(65) Prior Publication Data

US 2013/0086039 A1 Apr. 4, 2013

Related U.S. Application Data

(60) Provisional application No. 61/541,036, filed on Sep. 29, 2011, provisional application No. 61/661,737, filed on Jun. 19, 2012.

(51) Int. Cl.
*G06F 7/00* (2006.01)
*G06F 17/30* (2006.01)
*G06F 21/62* (2013.01)

(52) U.S. Cl.
CPC ... *G06F 17/30463* (2013.01); *G06F 17/30203* (2013.01); *G06F 17/30474* (2013.01); *G06F 17/30477* (2013.01); *G06F 21/6263* (2013.01)

(58) Field of Classification Search
CPC .................................................. G06F 17/30203
USPC ........................................................ 707/781
See application file for complete search history.

(56) References Cited

U.S. PATENT DOCUMENTS

| | | | |
|---|---|---|---|
| 2006/0177023 A1* | 8/2006 | Vaghar et al. | 379/88.17 |
| 2007/0192296 A1 | 8/2007 | Burger et al. | |
| 2008/0022370 A1* | 1/2008 | Beedubail et al. | 726/4 |
| 2008/0120273 A1 | 5/2008 | Ramesh et al. | |
| 2010/0145929 A1 | 6/2010 | Burger et al. | |

OTHER PUBLICATIONS

"Data Federation: The Key to Harnessing Big Data", A Cirro White Paper, Cirro, 2012, pp. 1-11.
"A New Era for Data Access and Exploration for Total Data," A Cirro White Paper, Cirro 2012, pp. 1-10.
Garcia-Molina, et al., Chapter 16—The Query Compiler, *Database systems: the complete book*, Jan. 2002, Pearson Education, pp. 787-874.
Kabra, et al., "efficient mid-query re-optimization of sub-optimal query execution plans," Sigmod Record, Jun. 1998, vol. 27, No. 2, pp. 106-117.

* cited by examiner

*Primary Examiner* — Ajith Jacob
(74) *Attorney, Agent, or Firm* — McDermott Will & Emery LLP

(57) ABSTRACT

The subject technology provides configurations for receiving a query for data stored across data systems in which the query is associated with a user. It is determined if the user has permission to execute an operation from the query at a data in which the operation is executed upon at least one table provided by the data system. The subject technology determines if the operation corresponds to a cache object in a cache registry if the user has permission. Each cache object is owned by a cache manager user. A view associated with the user is created that provides temporary access privileges to the cache object corresponding to the operation in which the cache object includes results of the operation executed in the query and the cache object is owned by the cache manager user. The results of the operation are then provided in the created view to the user.

18 Claims, 12 Drawing Sheets

405
Select A.id, B.name, C.state from A join B on A.id=B.id
join C on B.id=C.id

410

420

REAL-TIME SECURITY MODEL PROVIDING INTERMEDIATE QUERY RESULTS TO A USER IN A FEDERATED DATA SYSTEM

CROSS-REFERENCE TO RELATED APPLICATIONS

The present application claims the benefit of priority under 35 U.S.C. §119 from U.S. Provisional Patent Application Ser. No. 61/541,036 entitled "FEDERATED QUERY ENGINE FOR FEDERATION OF DATA QUERIES ACROSS STRUCTURE AND UNSTRUCTURED DATA," filed on Sep. 29, 2011, and U.S. Provisional Patent Application Ser. No. 61/661,737 entitled, "FEDERATED QUERY ENGINE FOR FEDERATION OF DATA QUERIES ACROSS STRUCTURED AND UNSTRUCTURED DATA," filed on Jun. 19, 2012, the disclosures of which are hereby incorporated by reference in its entirety for all purposes.

BACKGROUND

Data systems contain a variety of data query and storage engines from a variety of manufacturers. Each engine has certain advantages and disadvantages for its use, as well as different versions of data access languages such as SQL (Structured Query Language). All these differences present a complex problem for users who want to extract value from the data regardless of where the elements of data may exist. For instance, those users make multiple connections, use multiple tools, and possess a variety of skills to enable access to data as a whole.

SUMMARY

The subject technology includes a machine-implemented method for receiving a query for data stored across a plurality of data systems in which the query is associated with a user; determining if the user has permission to execute an operation from the query at a data system among the plurality of data systems in which the operation is executed upon at least one table provided by the data system; determining if the operation corresponds to a cache object in a cache registry if the user has permission in which the cache registry includes a set of cache objects respectively corresponding to at least one operation executed in a respective query, each cache object including results of the at least one operation executed in the respective query, and each cache object is owned by a cache manager user; creating a view associated with the user that provides temporary access privileges to the cache object corresponding to the operation in which the cache object includes results of the operation executed in the query and the cache object is owned by the cache manager user; and providing the results of the operation in the created view to the user.

The subject technology further includes a system. The system includes one or more processors, and a machine-readable medium comprising instructions stored therein, which when executed by the one or more processors, cause the processors to perform operations including receiving a query for data stored across a plurality of data systems in which the query is associated with a user; determining if the user has permission to execute an operation from the query at a data system among the plurality of data systems in which the operation is executed upon at least one table provided by the data system; determining if the operation corresponds to a cache object in a cache registry if the user has permission in which the cache registry includes a set of cache objects respectively corresponding to at least one operation executed in a respective query, each cache object including results of the at least one operation executed in the respective query, and each cache object is owned by a cache manager user; creating a view associated with the user that provides temporary access privileges to the cache object corresponding to the operation in which the cache object includes results of the operation executed in the query and the cache object is owned by the cache manager user; and providing the results of the operation in the created view to the user.

Additionally, the subject technology provides a non-transitory machine-readable medium comprising instructions stored therein, which when executed by a machine, cause the machine to perform operations including receiving a query for data stored across a plurality of data systems in which the query is associated with a user; determining if the user has permission to execute an operation from the query at a data system among the plurality of data systems in which the operation is executed upon at least one table provided by the data system; determining if the operation corresponds to a cache object in a cache registry if the user has permission in which the cache registry includes a set of cache objects respectively corresponding to at least one operation executed in a respective query, each cache object including results of the at least one operation executed in the respective query, and each cache object is owned by a cache manager user; providing the cache object for including in a view in response to determining the operation corresponds to the cache object; creating a view associated with the user that provides temporary access privileges to the cache object corresponding to the operation in which the cache object includes results of the operation executed in the query and the cache object is owned by the cache manager user; providing the results of the operation in the created view to the user; and dropping the created view after providing the results of the operation in the created view.

It is understood that other configurations of the subject technology will become readily apparent from the following detailed description, where various configurations of the subject technology are shown and described by way of illustration. As will be realized, the subject technology is capable of other and different configurations and its several details are capable of modification in various other respects, all without departing from the scope of the subject technology. Accordingly, the drawings and detailed description are to be regarded as illustrative in nature and not as restrictive.

BRIEF DESCRIPTION OF THE DRAWINGS

The features of the subject technology are set forth in the appended claims. However, for purpose of explanation, several configurations of the subject technology are set forth in the following figures.

DETAILED DESCRIPTION

Figure 1:
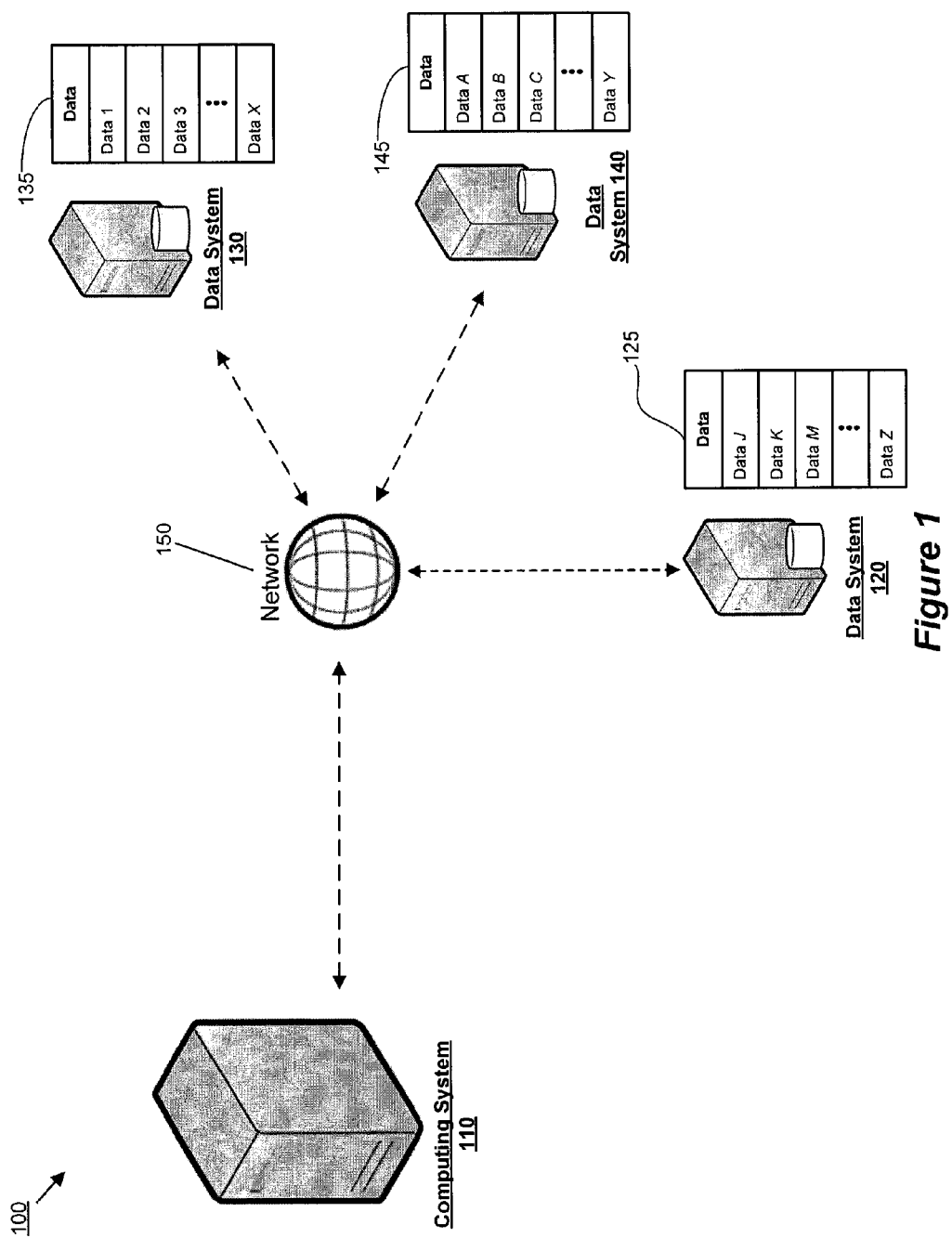
FIG. 1 illustrates an example computing environment for federation of data queries across one or more computing systems according to some configurations of the subject technology.

The detailed description set forth below is intended as a description of various configurations of the subject technology and is not intended to represent the only configurations in which the subject technology may be practiced. The appended drawings are incorporated herein and constitute a part of the detailed description. The detailed description includes specific details for the purpose of providing a thorough understanding of the subject technology. However, the subject technology is not limited to the specific details set forth herein and may be practiced without these specific details. In some instances, structures and components are shown in block diagram form in order to avoid obscuring the concepts of the subject technology.

Some approaches to handle a heterogeneous computing environment for accessing data across disparate systems may resolve only a part of the problem of accessing these types of widely spread and different data stores. Performance, ease of use, manageability, interoperability, cost of ownership, and other concerns should be addressed to resolve this complicated problem in an effective manner.

Adding to all of this difficulty is the emergence and acceptance of new unstructured data stores such as HADOOP, a software framework that supports data-intensive distributed applications, which operate totally differently from structured data stores. Allowing federation over these engines in addition to structured stores is a much more complex problem requiring a new approach to federation. Although the emergence of these unstructured data stores increases the need for federation to allow melding of data from both structured and unstructured stores, it increases complexity of doing so dramatically.

A related significant hindrance to using unstructured data such as HADOOP provides within map-reduce is the need to do programming for specific functionality. This increases the skill level required dramatically and prevents common business users from extracting value from unstructured data. The melding of data from structured and unstructured stores is also difficult and complex, requiring yet another skill set. All of these requirements hinder the adoption of the use of unstructured data significantly and greatly complicate the combined use of data as a whole.

In some configurations, the subject technology advantageously fills the aforementioned deficiencies by providing a system including a federated query engine that advantageously allows for automatic querying of both structured and unstructured data alike from multiple data engines and stores without prior configuration and with optimal performance. In this manner, the herein described federated query engine provides access to any and all data stores with a single language and access point.

One objective of the subject technology is to abstract the physical storage of the data from the logical use of that data. This objective can be accomplished in one or more of the following ways: providing a single connection point to query data in multiple engines using a single tool and single language; invisibly managing the movement of data between the engines that partake in the query execution; providing access to unstructured data in the same syntactical manner as structured data; and providing the ability to process data within a structured or an unstructured engine in equivalent functionality.

Another objective of the subject technology is to provide fast performance without the user needing to understand the details of cost for each operation on various systems. This objective may be accomplished by costing both structured and unstructured data operations across multiple data engines in a normalized fashion, taking into account data movement costs, then providing periodic re-optimization to ensure that the best plan is chosen as information becomes more precise.

Another objective of the subject technology is to produce metadata and cost metrics for completed operations from queries that can be used subsequently to produce performance predictions and improve on cost analysis in future executions. This allows the herein described system to improve in predictive accuracy through time. Yet another objective of the subject technology is to provide a solution for data access among various data stores and engines and types that does not suffer from many of the problems or deficiencies associated with other solutions.

FIG. 1 illustrates an example computing environment 100 for federation of data queries across one or more computing systems. More specifically, the computing environment 100 includes a computing system 110 and data systems 120, 130 and 140.

In some configurations, the computing system 110 includes a federated query engine for executing a data query or queries across multiple data systems for accessing different types of data stored in a database or similar storage scheme on a respective data system. In this manner, the federated query engine may coordinate execution of a query across the multiple data systems. The federated query engine is described in further detail below.

As illustrated in FIG. 1, the data systems 120, 130 and 140 are multiple autonomous data systems that respectively store data 125, data 135 and data 145. Moreover, the data systems 120, 130 and 140 (including data stored therein) may aggregately form a federated data system that manages/provides federated data across the multiple data systems. Some examples of data stored by a respective data system may include, but are not limited to, data stored according to a relational database management system, data from an online social networking service, data stored across a distributed system (e.g., NoSQL, HADOOP), metadata, etc.

Other types of data may be provided in a respective data system and still be within the scope of the subject technology.

As illustrated in the example of FIG. 1, the computing system 110 and the data systems 120, 130 and 140 are interconnected via a network 150. In one example, the computing system 110 utilizes an appropriate data connection(s) (e.g., Java Database Connectivity, Open Database Connectivity, etc.) for communicating with each of the data systems. Over one or more data connections, the computing system 110 can transmit and receive data via the network 150 to and from the data systems 120, 130 and 140. The network 150 can include, but is not limited to, a local network, remote network, or an interconnected network of networks (e.g., Internet). Similarly, the data systems 120, 130 and 140 may be configured to communicate over the network 150 with the computing system 110 by using any sort of network/communications/data protocol.

Although the example shown in FIG. 1 includes a single computing system 110, the computing system 110 can include a respective cluster of servers/computers that perform a same set of functions provided by the computing system 110 in a distributed and/or load balanced manner. A cluster can be understood as a group of servers/computers that are linked together to seamlessly perform the same set of functions, which can provide performance, reliability and availability advantages over a single server/computer architecture. Additionally, other data systems may be included in the example computing environment and still be within the scope of the subject technology.

Figure 2:
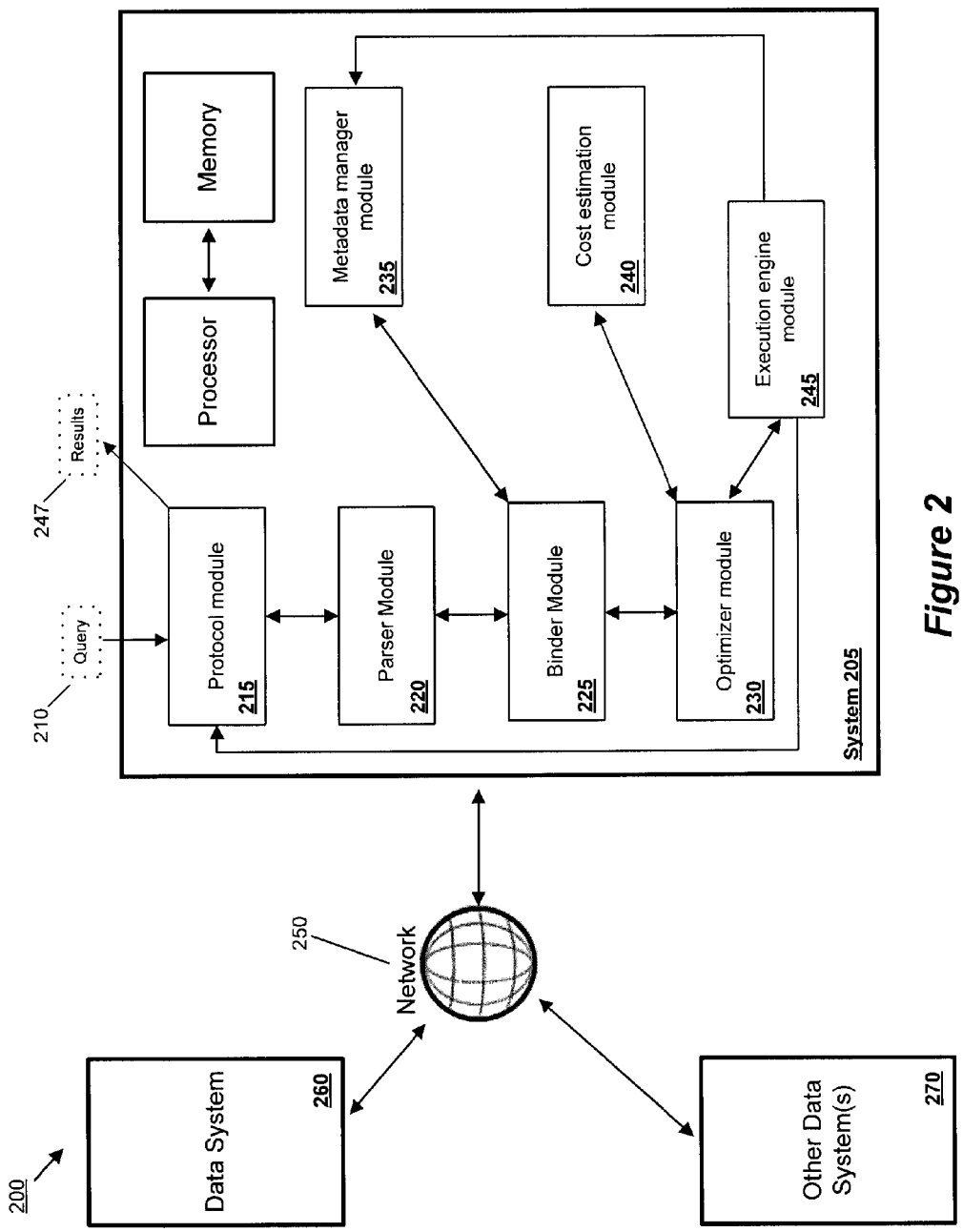
FIG. 2 conceptually illustrates a high level architectural layout of a system that implements a federated query engine according to some configurations of the subject technology FIG. 3 conceptually illustrates an example process for executing several operations of a query according to a cost determination of a set of execution plans for the query.

FIG. 2 conceptually illustrates a high level architectural layout 200 of a system 205 that implements a federated query engine according to some configurations of the subject technology. The federated query engine can be implemented for execution on one or more computing devices/systems. In particular, FIG. 2 shows a system 205 for implementing the federated query engine described in the computing system 110 in FIG. 1 and the processes in FIGS. 3 and 5. The following description of FIG. 2 may describe different operations in a linear fashion for the sake of not obscuring the discussion. However, it should be appreciated that any of the operations described in FIG. 2 may be executed in a parallel manner and still be within the scope of the subject technology.

The system 205 includes memory, one or more processors, and one or more modules stored in memory and configured for execution by the one or more processors. As shown in FIG. 2, the system 205 includes several modules for providing different functionality. According to one aspect of the subject technology, a federated query engine is provided that includes the following components: a protocol module 215, a parser module 220, a binder module 225, an optimizer module 230, a metadata manager module 235, a cost estimation module 240 and an execution engine module 245.

The protocol module 215 is configured to manage end user connections by utilizing standardized database connectivity technologies such as JAVA Database Connectivity (JDBC) or Open Database Connectivity (ODBC), etc. In this manner, the protocol module 215 is configured to allow for a variety of connection types to be utilized. After a connection is established, one or more queries received from a corresponding end user are transmitted to the parser module 220 for validation. For instance, an end user connects to the federated query engine through an industry standard protocol such as but not limited to ODBC or JDBC. The end user then submits a query 210 using a common language such as SQL. The protocol module 215 extracts the text of the query 210 into a standard internal format (e.g., a format that the federated query engine may process) irrespective of the protocol used to connect to the federated query engine. The protocol module 215 then transfers the query 210 to the parser module 220 for processing.

The parser module 220 is configured to validate that a syntax of the language used within the received query is without syntactical error according to a set of predetermined syntactical rules. After the syntax of the query 210 is validated, the query 210 is converted into a query tree which is then transmitted to the binder module 225. By way of example, the parser module 220 receives the query 210 from the protocol module 215 and parses out the words or tokens. The parser module 220 is configured to check the syntax of the query 210 for correctness based on the parsed words or tokens. If the syntax of the query 210 is correct, the parser module 220 converts the query 210 into a query tree. Examples of a query tree are described in more detail with respect to FIG. 4A below. The parser module 220 is configured to then identify each data element referenced in the query tree. An example of a data element may be a table stored on a particular data system or similar source of data. The parser module 220 then transmits the query tree to the binder module 225.

The binder module 225 receives the query tree from the parser module 220. The binder module 225 is configured to access the metadata manager module 235 to lookup each data element referenced by the query tree to add associated metadata. For instance, the binder module 225 contacts the metadata manager module 235 for each data element referenced in the query to bind associated metadata to each data element. After all associated metadata is bound to corresponding data elements referenced within the query tree, the binder module 225 transmits the query tree to the optimizer module 230.

The metadata manager module 235 is configured to bind to the data element any known metadata about that element. Such metadata may include a number of rows, row size, and/or data types. The metadata manager module 235 is configured to contact an appropriate persistent data store for that such metadata. In one example, the persistent data store is identified by the naming convention of the data element, which contains an identifiable reference to the data element location. For instance, the metadata manager module 235 contacts an appropriate metadata store for the data element being processed. The metadata manager module 235 is configured to utilize any required communication mechanisms for the various metadata stores. In this manner, any metadata synchronization issues between the federated query engine and the data stored on the metadata stores are minimized.

In one example, the metadata stores respectively correspond to a data system registered with the federated query engine. In particular, a metadata store may store metadata for unstructured data elements when the system 205 does not carry enough metadata. In one example, the metadata for unstructured data elements is stored within a relational database that allows the metadata to be controlled/modified by the system 205. In instances in which other entities are able to modify the metadata in a given metadata store, the metadata manager module 235 is configured to perform a "lookup" of the metadata in that metadata store. Thus, the metadata manager module 235 does not necessarily store any persistent metadata, and instead performs lookups as required (e.g., when other entities may modify the metadata and the system 205 does not control the metadata). Any matching metadata for a given data element from the query tree is then returned to the binder module 225 for that data element.

After the metadata manager module 235 returns metadata to the binder module 225, the binder module 225 determines an output data size of a bottommost node in the query tree and then the above nodes are able to calculate an estimate of an output data size for each of the above nodes. This is done because a shape of a query plan may change as a logical exploration continues up through the query tree. The binder module 225 is configured to then transmit the query tree augmented with metadata and the data size estimates to the optimizer module 230 for processing.

The optimizer module 230 is configured to initially process a logical representation of the query tree, and then determine any alternative physical plans. Examples of these operations are described in further detail in FIGS. 3 and 5. For instance, the optimizer module 230 makes the best choice on how to execute the query given multiple possibilities based on the logical and physical plans. In one example, the optimizer module 230 is configured to determine an estimated cost to each possible execution plan for each required operation or group of operations and then select the best overall execution plan based on the estimated cost. As described in further detail below, the estimated cost may be based on a historical record of completed queries, business rules, actual dynamic runtime loading metrics and/or other data or metrics.

Costs may be initially seeded with initial predetermined values (e.g., based on one or more operations for small, medium, or large systems) for each data system, and each subsequently executed operation may be statistically incorporated into the initial predetermined values as part of the historical record for determining an estimated cost. In one example, the estimated cost in the historical record is allowed to gradually drift based on a weighted average between a current value for a recently executed query and an existing value (e.g., based on the initial predetermined cost). The aforementioned estimated cost may be derived through utilizing the cost estimation module 240. As an additional alternative implementation, the cost estimation module 240 processes each operation or groups of operations, and queries each functionally capable data engine provided by a corresponding data system to determine an estimated cost in some configurations. The estimated cost may be based on latency for the data system, cost per row, cost per operation in the query, etc. Actual dynamic runtime loading metrics may also be utilized to determine the estimated cost. With respect to business rules, the cost estimation module 240 may remove some options according to one or more business rules that specify time of day constraints, security concerns, etc. Additionally, the cost estimation module 240 is configured to normalize the costs across multiple data systems to present a normalized cost value to the optimizer module 230. The optimizer module 230 is configured to then select the overall best execution plan based on the corresponding estimated cost (now normalized). The selected execution plan for the query is then transmitted to the execution engine module 245 for execution.

The execution engine module 245 receives the selected execution plan for execution of the query (as represented in the query tree) and begins to perform the necessary execution by generating proper syntax for the corresponding data system and requesting the engine to execute an operation or set of operations from the query. In one example, to execute the plan, the execution engine module 245 uses appropriate drivers or connection methods to connect to each data system and transfers the proper syntax across the proper protocols. The execution engine module 245 also executes any required data movement operations to move data from one data system to another through appropriate protocols and commands.

Once that operation or set of operations is complete, the execution engine module 245 may persist any data resulting from the operation(s) and then retrieve further metadata about the operation and results. The execution engine module 245 then sends any updated metadata information back to the optimizer module 230 and requests a re-optimization given the results of the operation(s). The re-optimization may result in a changed plan of execution for the remainder of the operations from the execution plan that have not yet executed. The execution engine module 245 then receives a plan with the lowest cost from the optimizer module 230 and performs another operation from the query. These aforementioned steps of re-optimization may be repeatedly performed for each of the remaining operations in the query. However, in some instances, re-optimization is not performed.

Once the query is entirely executed, the execution engine module 245 is configured to then transmit results 247 of the query back to the protocol module 215 for transmitting to the end user. When the entire execution plan has been executed, the results 247 from the execution engine module 245 are transmitted to the protocol module 215. The protocol module 215 is configured to format the results 247 and submit the results 247 to the end user using the appropriate protocols.

Additionally, in some configurations, the metadata manager module 235 is contacted by the execution engine module 245 to record new values for actual execution time, sizes, etc., into the metadata about a given data system. In this manner, the system 205 builds a historical record per operation executed to refine the data over time and allow for more accurate estimations in the future. These data values can be specific to include things such as the size of data processed, loading on the system at the time, individual step operation executed, type of data, etc.

Figure 3:
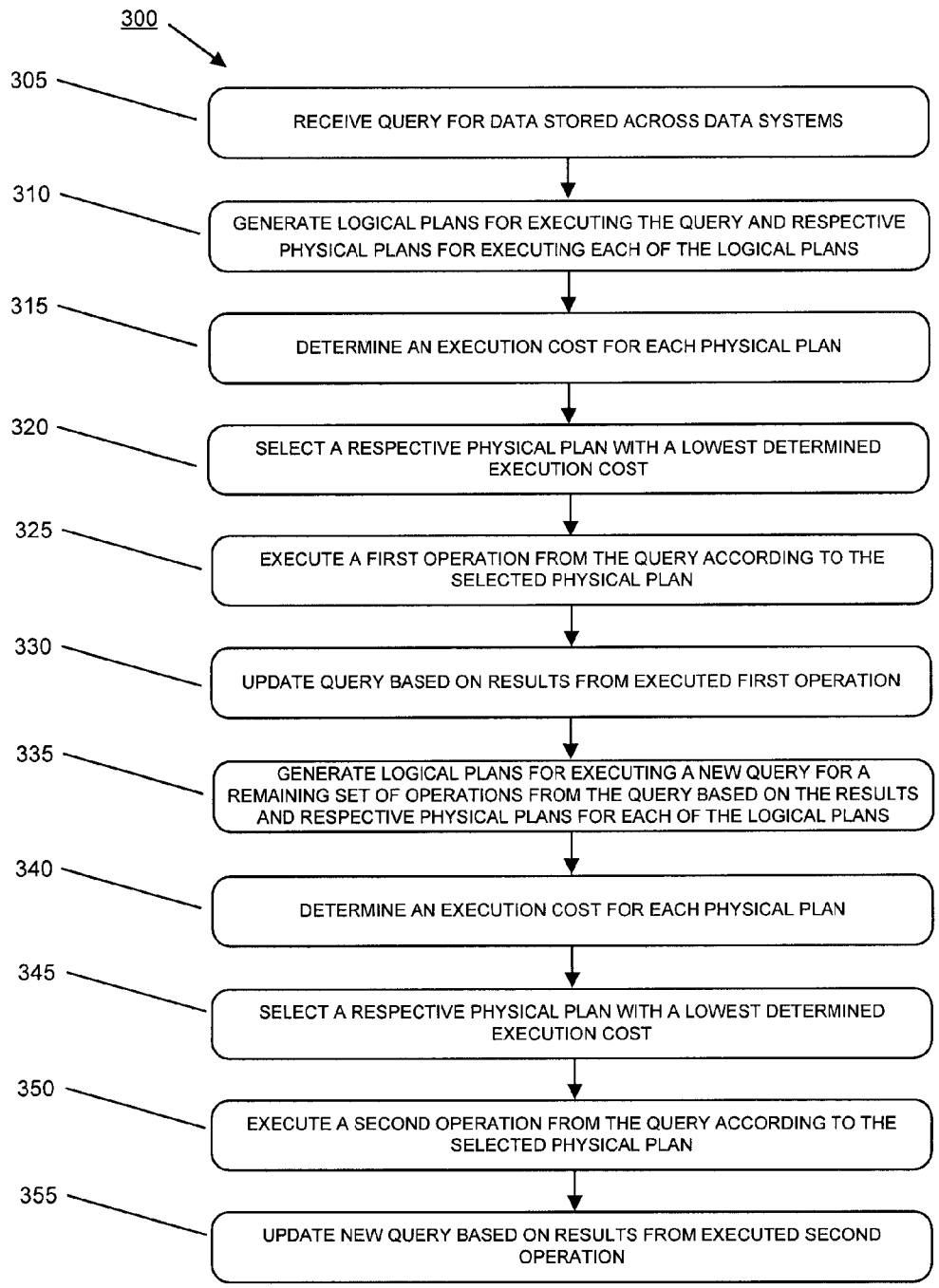

FIG. 3 conceptually illustrates an example process 300 for executing several operations of a query according to a cost determination of a set of execution plans for the query. The process 300 can be performed by one or more computing devices or systems in some configurations. More specifically, the process 300 describes steps that are performed by the aforementioned federated query engine for executing a query in one example. Although the example process 300 illustrated in FIG. 3 shows a linear execution of operations, it should be appreciated that any of the operations in FIG. 3 may be executed in a parallel manner and still be within the scope of the subject technology.

The process 300 begins at 305 by receiving a query for data stored across a multiple data systems. The data stored across the multiple data systems may include federated data in some implementations.

At 310, the process 300 generates logical plans for executing the query and respective physical plans for executing each of the logical plans. In some configurations, each logical plan includes a sequence of one or more operations for executing the query. In one example, each logical plan comprises a query tree including one or more nodes, each node representing a respective operation in the sequence of one or more operations for executing the query. Each node of the query tree either has an expected data size or is capable of calculating the data size through recursive algorithms. Thus, rather than include an estimated output data size for all of the nodes in the query tree, it is more beneficial to recursively calculate a size estimate at any stage for any of the above nodes in the query tree. Further, as mentioned above, the process 300 at 305 generates respective physical plans for executing the query on the data systems for each of the logical plans. Each physical plan represents a set of operations that describe corresponding physical steps for executing the operations. For instance, a respective physical plan may describe permutations for physically moving data from one data system to another data system for performing one or more operations from the query. Moreover, some configurations provide that an available data system, which does not initially include any of the required data from the query, may be included in a respective physical plan. Thus, a respective physical plan need not be limited to the actual data systems which initially include the required data from the query, and any available data system may be included for a given physical plan for performing an operation(s) from the query.

The process 300 at 315 then determines an execution cost for each physical plan from the respective physical plans. In some configurations, the process 300 looks at costs associated with latency, cost per row, movement costs, and/or cost per operation in order to determine the execution cost for each physical plan. In one example, the costs may be determined when applied to the aforementioned size estimates and/or based on additional metadata associated with a given data system. For instance, the metadata may be based on a historical record of costs for performing respective operations of previously executed operations, which in turn may be normalized across different data systems. Initially, each data system may be seeded with initial predetermined costs (e.g., based on one or more operations for small, medium, or large systems), and each subsequently executed operation may be statistically incorporated into the initial predetermined costs as part of the historical record for determining an estimated cost. In one example, the estimated cost in the historical record is allowed to gradually drift based on a weighted average between a current value for a recently executed query and an existing value (e.g., based on the initial predetermined cost). In this regard, the historical record of costs may be weighted more heavily toward older historical data than for newer data.

The process 300 at 320 then selects a respective physical plan with a lowest determined execution cost among the determined execution cost for each physical plan from the respective physical plans. In this manner, the process 300 may utilize the respective physical plan that is predicted to provide optimal performance based on execution costs.

The process 300 continues to 325 to execute the first operation from the query tree according to the selected physical plan. The first operation may correspond with a bottom node from the query tree.

At 330, the process 300 updates the query based on results from the executed first operation. In some configurations, as part of updating the query, the process 300 may persist data resulting from the executed first operation from the query. Alternatively, the process 300 may not persist data but may continue to execute more operations from the query before deciding to persist the data. By way of example, the process 300 may determine to persist data when no dependencies exist after a particular operation. Further, the process 300 may determine to persist data based on the data systems involved and the type of data movement that is to be performed. For example, in a case where data can be streamed between locations, such as between different data systems, persisting the data may not be needed in this case. In other cases, the data must be prepared for movement between locations and the data is persisted. In some configurations, movement of data between heterogeneous data systems will require some data to be persisted. The persisted data may be stored in a temporary table on a given data system for subsequent access in some configurations.

The process 300 at 335 1) generates logical plans for executing a new query for a remaining set of operations from the query, and 2) generates respective physical plans for each of the logical plans for executing the new query. In some configurations, generating the respective physical plans may be based on persisted data and/or newly available meta-data. In this regard, corresponding size estimates in a respective physical plan may be replaced with the results of the first operation (or from the results stored in the persisted data) in order to generate the respective physical plans. At 340, the process 300 determines an execution cost for each of the respective physical plans. Next, the process 300 at 345 selects a physical plan with a lowest execution cost among the respective physical plans.

The process 300 at 350 executes a second operation from the query according to the selected physical plan. Alternatively, the process 300 in some instances continues to execute one or more operations until reaching a point for performing a re-optimization of logical and physical plans based on the results of the executed operations. At 355, the process 300 updates the new query based on results of the executed second operation (or executed operations). The process 300 then ends. In this manner, the process 300 may execute the plan with the lowest execution cost after completing each operation in the query as the plans are re-optimized to account for the results of a previous operation, which may result in a more accurate estimation of costs for the plans.

Although executing a first and second operation are described in the example of FIG. 3, it should be understood that the process 300 repeats the above described steps for re-optimizing the physical plans for the remaining operations until each operation from the query is executed. The process 300 may then provide the results of the query for output after the query is completely executed. The process 300 then ends.

Figure 4A:
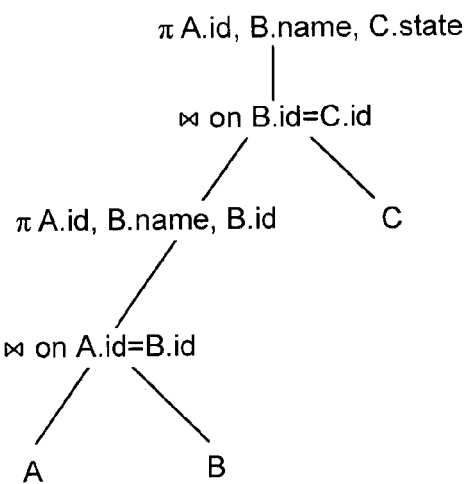
FIG. 4A conceptually illustrates example query trees for a query according to some configurations of the subject technology.
Figure 4A:
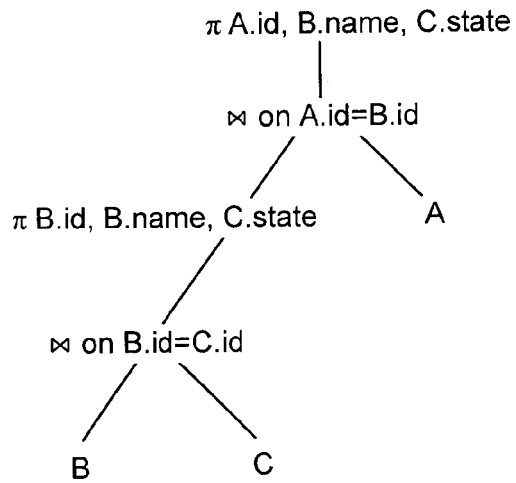

FIG. 4A conceptually illustrates example query trees for a query 405 according to some configurations of the subject technology. As illustrated, FIG. 4A includes query trees 410 and 420 which represent possible logical plans for executing the query 405 (illustrated as "Select A.id, B.name, C.state from A join B on A.id=B.id join C on B.id=C.id"). In the example shown in FIG. 4A, the query 405 includes operations on tables A, B, and C, and tables A, B and C are respectively stored on three different data systems 1, 2 and 3. Query trees 410 and 420 may provided by the federated query engine when generating logical plans for a given query. Query trees 410 and 420 include multiple nodes that each represent a respective operation or set of operations from the query 405. Although two query trees are shown in the example of FIG. 4A for the sake of simplicity, it should be appreciated that more query trees for other logical plans for the query 405 may be provided and still be within the scope of the subject technology.

For each of the query trees 410 and 420 corresponding to respective logical plans for the query 405, the federated query engine may provide a set of physical plan alternatives for executing the query 405. As mentioned above, the query 405 includes operations on tables A, B, and C, and tables A, B and C are respectively stored on three different data systems 1, 2 and 3. A set of physical plan alternatives for the query trees 410 and 420 are respectively illustrated in FIGS. 4B and 4C described below.

Figure 4B:
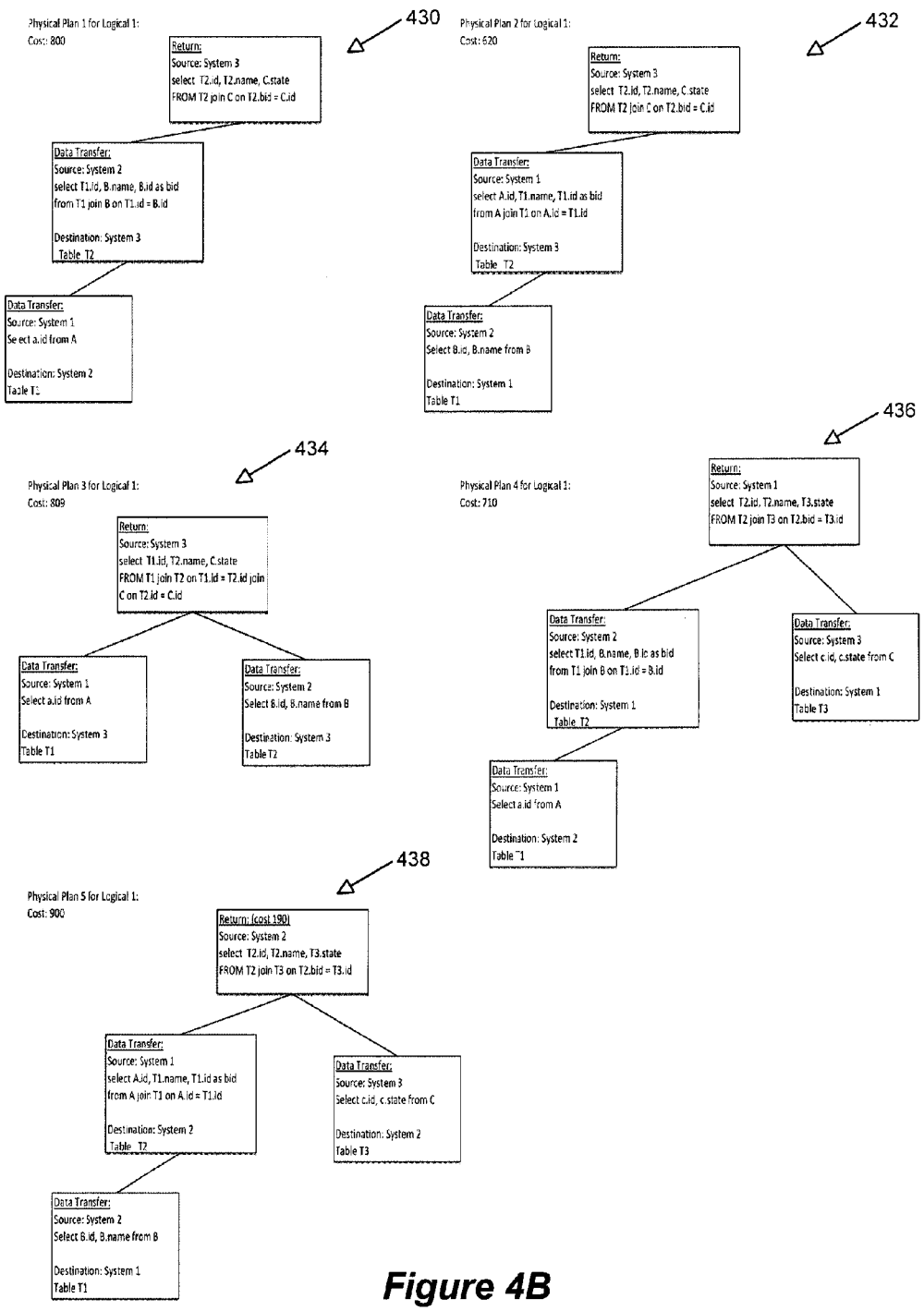
FIG. 4B conceptually illustrates an example set of alternative physical plans for a first query tree.
Figure 4C:
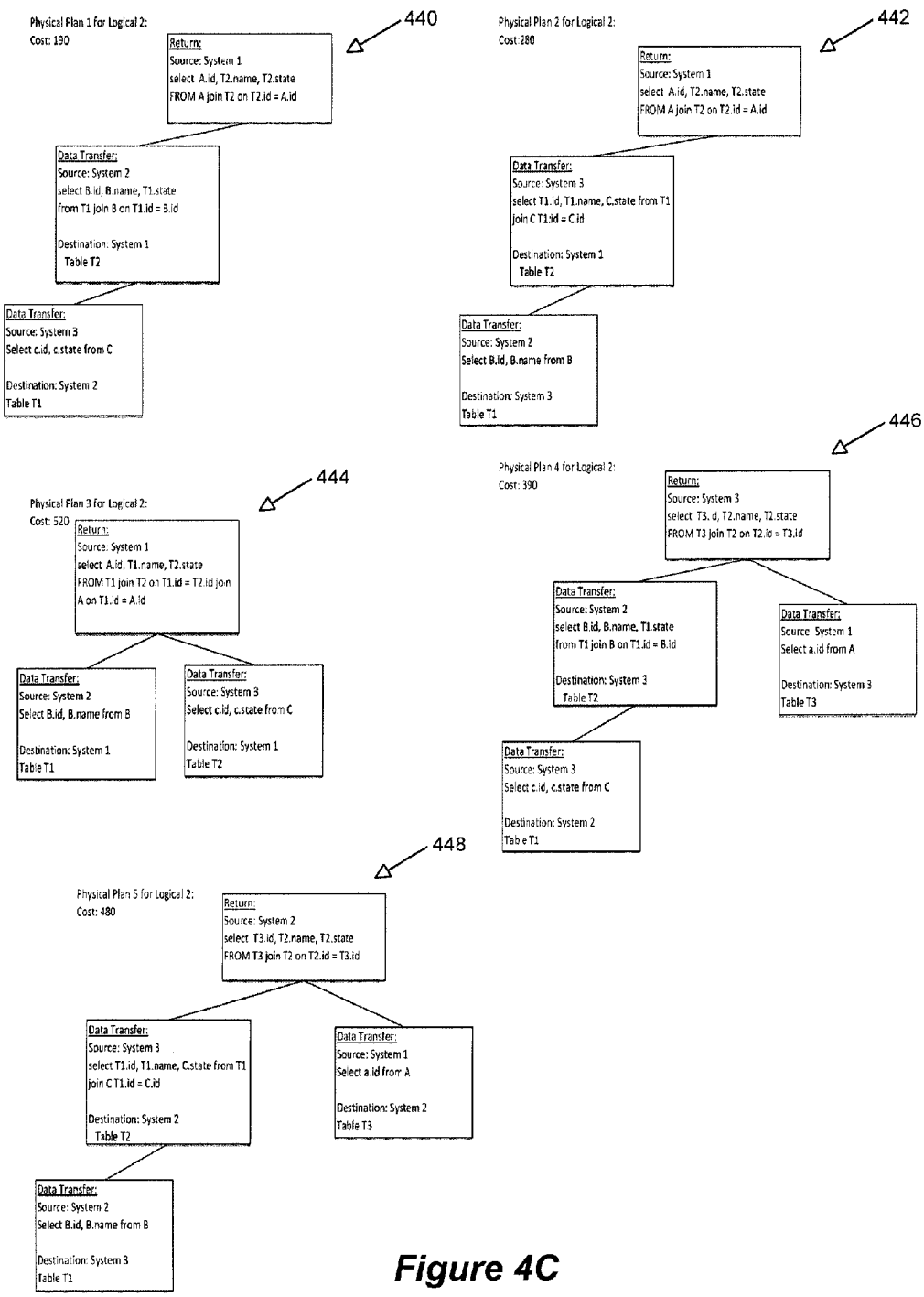
FIG. 4C conceptually illustrates an example set of alternative physical plans for a second query tree.

FIG. 4B conceptually illustrates an example set of alternative physical plans for a first query tree. FIG. 4C conceptually illustrates an example set of alternative physical plans for a second query tree. More specifically, FIGS. 4B and 4C illustrate a set of alternative physical plans, respectively, for the query trees 410 and 420 in FIG. 4A. For the logical plans that are generated in FIG. 4A, the federated query engine may select one of the set of alternative physical plans in either FIGS. 4B and 4C based on a calculated cost for performing a set of operations in the alternative physical plan. In one example, the federated query engine may then execute one or more operations in the selected alternative physical plan and then perform re-optimization of the logical plans and alternative physical plans based on the results of the executed operation(s).

A set of alternative physical plans 430, 432, 434, 436, and 438 for the query tree 410 (that logically represents the query 405 in FIG. 4A) is shown in FIG. 4B. Each alternative physical plan includes a set of nodes representing operations to be performed on each of the aforementioned data systems 1, 2 or 3. The federated query engine may execute a particular alternative physical plan starting from a bottom node and continuing up until reaching a root node of the alternative physical plan. For example, to execute the alternative physical plan 430, the federated query engine executes, starting at the bottom node, a data transfer operation for transferring results of an operation ("Select a.id from A") at data system 1 over to a table T1 at data system 2. The federated query engine then performs operations in the middle node of the alternative physical plan 430 including a data transfer operation for transferring results of an operation ("select T1.id, B.name, B.id as bid from T1 join B on T1.id=B.id") at data system 2 over to table T2 at data system 3. The federated query engine may continue to the top node of the alternative physical plan 430 to execute an operation ("select T2.id, T2.name, C.state FROM T2.join C on T2.bid=C.id") at data system 3. The federated query engine may return the results of this operation to the user. In a case in which the federated query engine selects one of the other alternative physical plans 432, 434, 436, and 438 for executing the query 405, the selected plan among the alternative physical plans 432, 434, 436, and 438 may be executed by the federated query engine in a similar manner (e.g., starting from the bottom node and continuing up until reaching the top node).

Each of the alternative physical plans 430, 432, 434, 436, and 438 of FIG. 4B includes an estimated cost for executing the corresponding alternative physical plan. In one example, an estimated cost of a corresponding alternative physical plan may represent a runtime cost for executing a query according to the corresponding alternative physical plan and may be based a number of I/O operations required for executing operations within the query, an estimated amount of time for executing the operations, processing/CPU requirements, expected utilization of network resources, estimated data transfer times, and other factors, etc. In the example of FIG. 4B, the alternative physical plan 432 has the lowest estimated cost (e.g., 620) among the set of alternative physical plans 430, 432, 434, 436, and 438. In the example of FIG. 4C, a set of alternative physical plans 440, 442, 444, 446, and 448 are shown. The alternative physical plan 440 has the lowest estimated cost (e.g., 190) among the set of alternative physical plans 440, 442, 444, 446, and 448. Thus, the alternative physical plan 440 has the lowest overall estimated cost among all of the alternative physical plans shown in FIGS. 4B and 4C. In one example, the federated query engine selects the alternative physical plan 440 as the alternative physical plan with the lowest overall cost and executes one or more operations from the alternative physical plan 440 by starting from the bottom node and continuing up to the top node similar to the example described above. The federated query engine may return the results of the query after performing the operations in the top node of the alternative physical plan 440.

In some configurations, the federated query engine may not execute all of the operations for the nodes for a given alternative physical plan such as the selected physical plan 440. For instance, a marker for re-optimization may be included at the middle node of the alternative physical plan 440. The federated query engine may execute the operations for the bottom node, persist the results of the bottom node, and then perform re-optimization of logical and physical plans for a remaining set of operations for the query 405 in order to provide a new set of logical and physical plans for the remaining set of operations of the query 405. A subsequent re-optimization of logical and physical plans for other remaining operations of the query 405 may be performed in a similar manner.

Figure 5:
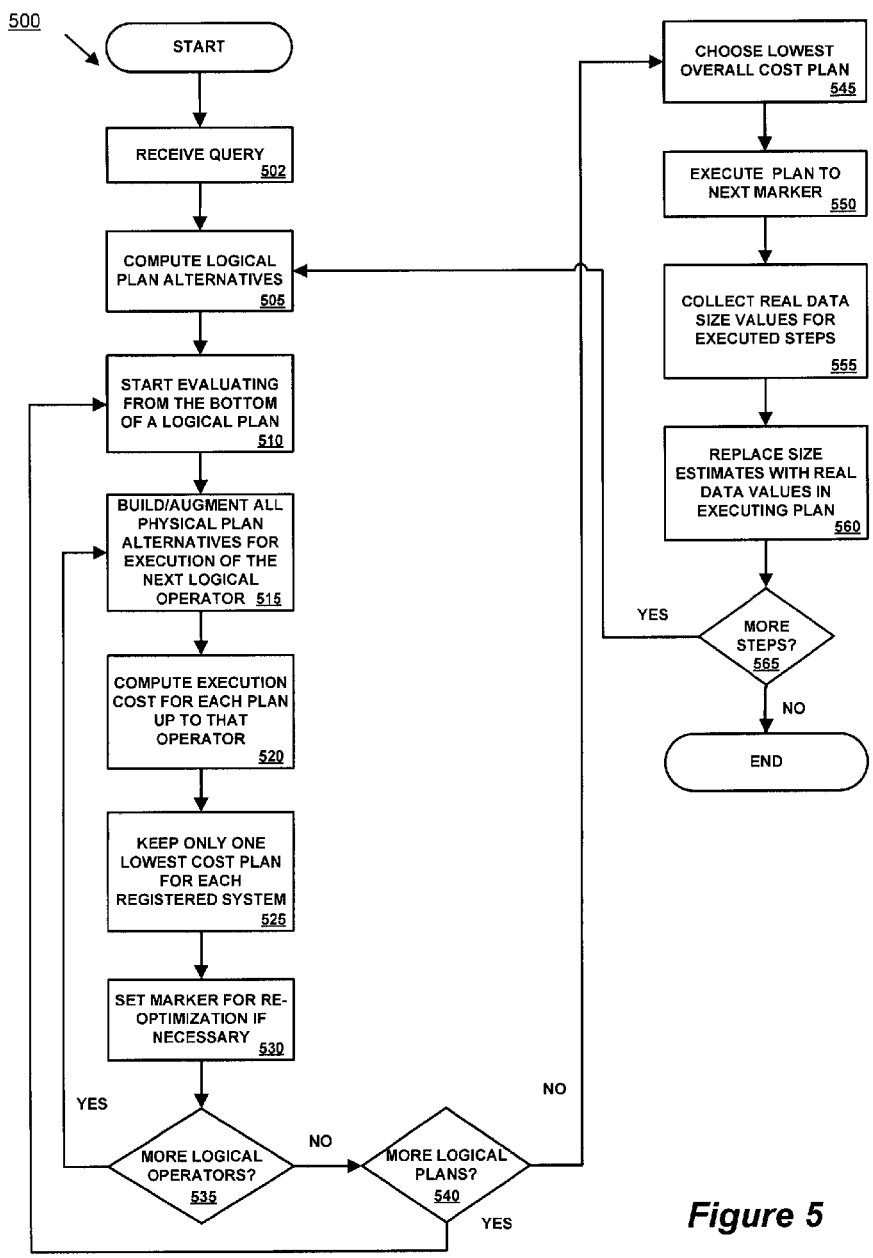
FIG. 5 conceptually illustrates an example process for optimization, re-optimization and execution according to some configurations of the subject technology.

FIG. 5 conceptually illustrates a process 500 representing the logic inside the aforementioned optimizer module 230 described in FIG. 2 above. In some configurations, the process 500 may be implemented by one or more computing devices or systems. Although the example process 500 illustrated in FIG. 5 shows a linear execution of operations, it should be appreciated that any of the operations in FIG. 5 may be executed in a parallel manner and still be within the scope of the subject technology.

The process 500 begins at 502 by receiving a query for data stored across multiple data systems. At 505, the process 500 generates one or more logical representations of a query tree for the query. In some configurations, the logical representations constitute logical plans for executing the query. The process 500 identifies the logical plans corresponding to the logical representations of the query tree that have the best chance for physical execution at highest performance according to the capabilities of respective data systems that may execute a portion of the query. The logical plans that do not represent expected reasonable performance are not added into the list of plans that are retained.

Next, the process 500 starts working on the physical execution plan. The following steps are performed for each logical plan that was generated at 505. To create a physical execution plan, the process 500 at 510 starts evaluating at the bottom of the logical plan, which is the source data (e.g., a table) in one example.

At 515, the process 500 builds physical plan alternatives for each logical plan from the bottom of the logical plan where source data is read, up to the return of results to the end user. The process 500 builds plan alternatives for executing the first logical operation on each of the available data systems. In one example, available data systems may include data systems that do not have persistent or source data, which would then include the need to move data from the source data system to the data system where the operator will be executed under the plan.

Next, the process 500 at 520 computes an execution cost that represents the cost of moving data if necessary and executing the first operation from the query. The costs are based on normalized cost metadata, which represents the ability of the each registered data system to perform that operation on the prescribed amount of data, plus the cost of moving the prescribed amount of data to that data system. This step is repeated for each of the alternative plans.

At this point the number of alternative plans could be up to the cube of the number of registered systems. Each plan has an overall cost associated with all execution up to the point of the currently evaluated logical operator. The process 500 at 525 then prunes out all but the single lowest cost plan per registered system. The total number of alternative plans for execution up to the currently evaluated operator is now reduced to no more than the number of registered systems.

The process 500 at 530 places a marker, if necessary, at a point in the physical execution plan where re-optimization should take place. Different techniques may be utilized to determine if a marker is needed, and also at which point to place such a marker. In some instances, the process 500 may determine that no marker is needed at all.

At 535, the process 500 determines if more logical operators corresponding to remaining operations in the query exist. If so, this series of steps 515-530 is repeated for all logical operators up the query tree. For each logical operator the process 500 builds all available plans using the remaining alternative plans from previously evaluated operators, costs all the alternative plans, and chooses only the best physical plan per registered system based on lowest cost. At 540, the process 500 determines if other logical plans exist (e.g., from 505) and the process 500 then repeats the steps at 510-535 until all logical plans are processed. Once the process 500 reaches the top of each of the logical plans, the process 500 has computed the total cost for executing the plan with the top operator on each of the registered systems.

At 545, the process 500 then chooses the lowest overall execution cost among the logical plan alternatives. In one example, the process 500 executes the plan tree from the bottom up. While executing the plan, the process 500 watches for the aforementioned re-optimization markers placed in the plan by the process 500 at 530. At the point that the process 500 reaches a re-optimization marker, the execution stops at 550. Alternatively, if no re-optimization markers are found, the process 500 continues until completion of the plan. For each step executed completely, the process 500 retrieves actual real data size value (e.g., row counts and sizes, etc.) for the resulting intermediate data results at 535, which may be supplied through some manner from the data system upon completion. At 560, the process 500 replaces size estimates with real data size values in the plan.

At 565, the process 500 determines if more operations are required to execute in the query, and if so a dynamic re-optimization begins. In this instance, the process 500 sends back the data containing actual values from the executed portion of the query and continues to 505. At 505, the process 500 generates one or more logical representations of the remaining operations from the query. The process 500 then repeats steps for reevaluating the logical plans and physical plans for the remaining steps, but utilizes the actual data size values for the executed portion of the query in place of the original estimates. At this point, the remainder of the execution tree may change from the original or it might remain the same. Any changes would potentially affect the remainder of the tree that has not executed yet.

The process 500 again submits a chosen execution plan at 545, and the process 500 executes the portion of the execution plan up to the next marker at 550. The process 500 continues to 555-565 until the entire query execution tree has been successfully executed. The process 500 then ends.

In some configurations, intermediate results from execution of an operation(s) from one or more queries may be stored in a cache registry as respective cache objects. Such cache objects may represent persistent data (e.g., results of a query operation(s)) on one or more data systems that can be utilized in other queries. In particular, during the logical exploration of a given query, physical plan alternatives are determined for each logical plan for executing the query. In this regard, a physical plan alternative may include accessing the cache registry for a cache object that corresponds with an operation within the logical plan or a set of operations that match a portion of a logical plan, such as a particular portion of the query tree. In a federated system including multiple autonomous data systems, persisting intermediate objects in a cache registry may provide performance gains that are realized.

However, queries may be executed by different users, each with a different set of permissions for the multiple data systems in the federated system. Thus, potential difficulties in providing a consistent security model for accessing cache objects may arise as permissions between users do not overlap in a consistent manner. In order to address these issues, the subject technology provides implementations for transparently managing cache objects to enable users to access cache objects irrespective of whether the cache objects may correspond to another user that originally executed the operation(s) from a query. In particular, example implementations forgo providing another layer of object security and instead rely on existing object security mechanisms provided by the data systems through the use of dynamic binding to confirm access to data provided by the data systems.

Figure 6A:
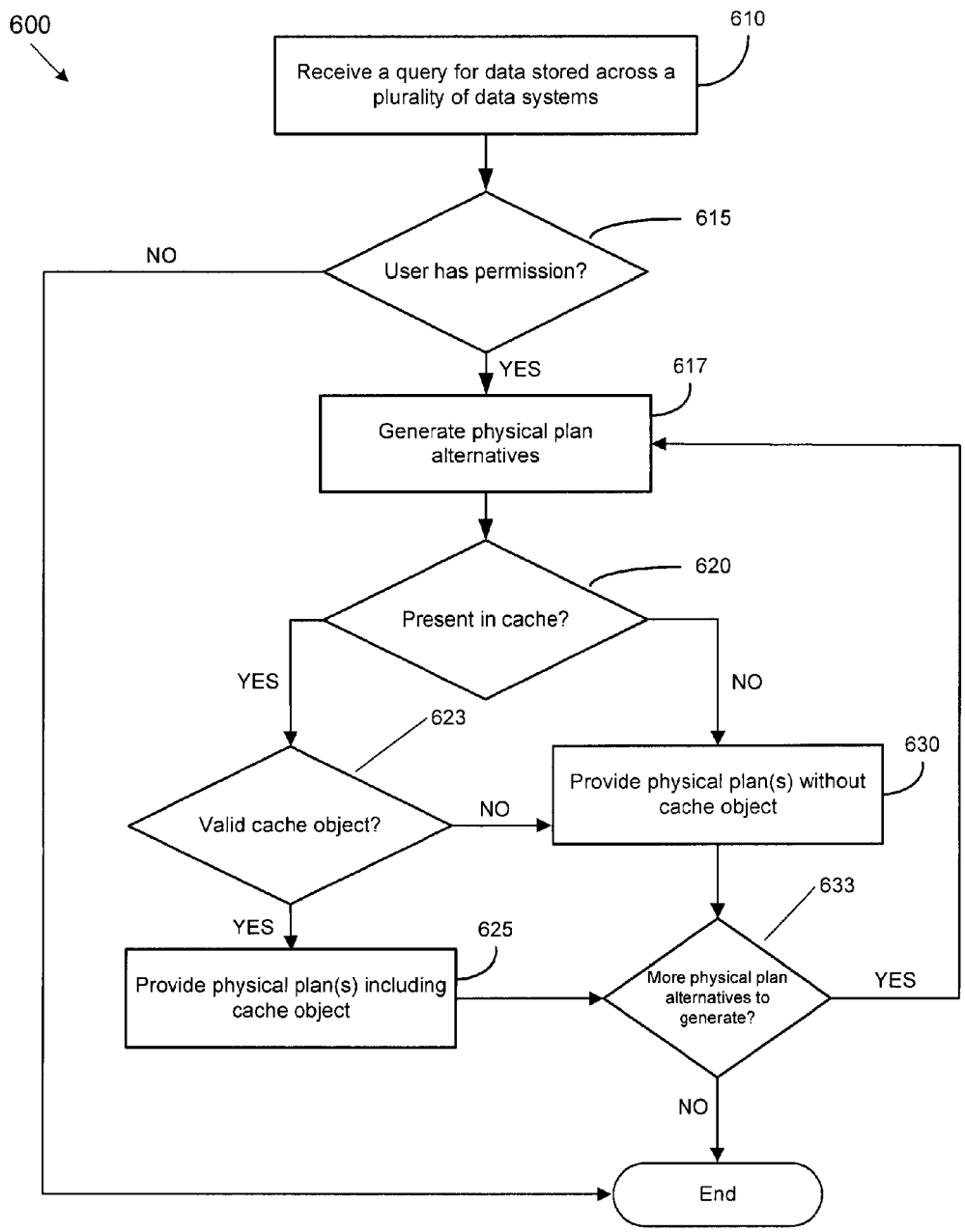
FIG. 6A conceptually illustrates an example process for providing a real-time security model for a given query in a federated data system.

FIG. 6A conceptually illustrates an example process for providing a real-time security model for a given query in a federated data system. In some configurations, the process 600 may be implemented by one or more computing devices or systems. Although the example process 600 illustrated in FIG. 6A shows a linear execution of operations, it should be appreciated that any of the operations in FIG. 6A may be executed in a parallel manner and still be within the scope of the subject technology. In some configurations, the process 600 may be executed conjunctively with the process described in FIG. 5 (e.g., as part of the operations for dynamic binding and determining logical plan alternatives and associated physical plan alternatives for a given query).

The process 600 begins at 610 by receiving a query for data stored across multiple data systems. The multiple data systems are part of a federated data system for providing and storing federated data in one example. The query is associated with a user that submits the query for accessing data from the data systems and the query includes one or more operations in one example.

The process 600 at 615 determines if the user has permission to execute one or more operations from the query at a data system among the multiple data systems. The subject technology leverages the underlying object security provided by the data systems to avoid implementing another layer of object security. In this manner, the subject technology is able to delegate the object security to a data system at bind time. For instance, determining if the user has permission to execute the operation may be based on a dynamic binding process that verifies permissions of the user for executing the operation(s) from the query. This may be done by utilizing an object security mechanism provided by the data system that determines if the user has access to the data referenced by the operation(s). In one example, the operation is executed upon at least one table provided by the data system. During dynamic binding, determining if the user has permission may be based on the data system checking an access control for the operation upon at least one table, which may occur in real-time. The access control identifies whether the user has permission to perform the operation(s) on a table or set of tables at the data system. Based on the results of checking the user's permissions during dynamic binding, the process 600 receives a verification of the user's permission. Alternatively, if the process 600 does not receive verification of the user's permission at 615, the process 600 then ends.

If the user's permission has been verified at 615, the process 600 continues to 617 to generate one or more physical plan alternative(s) for the query. The process 600 at 620 determines if a cache object is present in a cache registry that corresponds with one or more operation(s) included in the physical plan alternative(s) for the query. Determining if a cache object is present in the cache registry is performed as part of the exploration of physical plan alternatives for the query in one example. The cache registry includes a set of cache objects respectively corresponding to executed query operations. Each cache object may represent at least a portion of a physical plan alternative for a respective query. A physical plan alternative may be provided as part of exploring the levels of a logical plan of the query. For instance, such a physical plan involves accessing the cache object instead of performing an operation(s) for the respective query. Thus, each cache object includes results of an operation or set of operations performed from the respective query. In some configurations, the federated query engine stores information associated with each cache object in the cache registry in order to manage the cache registry. For each cache object, the federated query engine may store information such as metadata describing one or more operations that were executed, data corresponding to the results of the executed operation(s), a set of tables that the operation(s) was performed upon, a respective data system(s) associated with the set of tables, timestamp information indicating when the operation or set of operations were executed, an indicator of whether the data is still valid, etc. Other types of information may be stored and still be within the scope of the subject technology.

If a cache object is present in the cache registry at 620, the process 600 at 623 performs a check to determine if the cache object in the cache registry is still valid. In one example, the process 600 checks for a valid cache object based on the logical operations used to create the cache object, and cache expiration rules. If the cache object is not valid, the process 600 may invalidate the cache object in the cache registry, and the process 600 then continues to 630 to provide a physical plan alternative(s) without the cache object. The process 600 then continues to 633 to determine if there are more physical plan alternatives to generate. If there are no more physical plan alternatives to generate at 633, then the process 600 ends. Alternatively, if there are more physical plan alternatives to generate at 633, the process 600 continues to 617 to generate more physical plan alternatives and repeat the subsequent operations.

Alternatively, if the process 600 determines at 620 that a cache object is not present in the cache registry, the process 600 continues to 630 to provide a physical plan alternative(s) without the cache object. The process 600 then continues to 633 to determine if there are more physical plan alternatives to generate. If there are no more physical plan alternatives to generate at 633, then the process 600 ends. Alternatively, if there are more physical plan alternatives to generate at 633, the process 600 continues to 617 to generate more physical plan alternatives and repeat the subsequent operations.

In this manner, either the physical plan alternative(s) including or without the cache object is provided as part of the exploration of physical plan alternatives (e.g., for selecting a physical plan alternative for executing the query). The process 600 may be repeated for each user that submits a query for executing by the federated query engine.

Figure 6B:
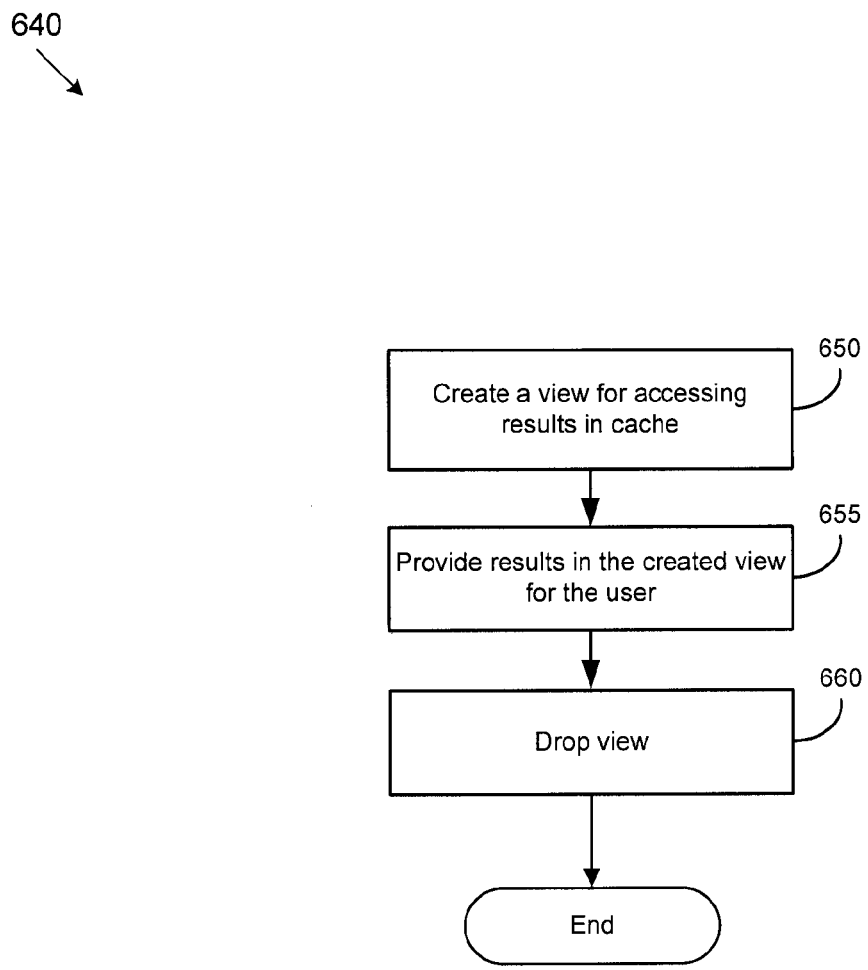
FIG. 6B conceptually illustrates an example process for providing temporary access privileges to intermediate query results provided by a cache object to a user in a federated data system.

As part of executing one or more operations from a given query, FIG. 6B conceptually illustrates an example process for providing temporary access privileges to intermediate query results provided by a cache object to a user in a federated data system. In some configurations, the process 640 may be implemented by one or more computing devices or systems. Although the example process 640 illustrated in FIG. 6B shows a linear execution of operations, it should be appreciated that any of the operations in FIG. 6B may be executed in a parallel manner and still be within the scope of the subject technology. In some configurations, the process 640 may be executed conjunctively with the process described in FIG. 5.

In some instances, a cache object in a cache registry may be accessed for providing results of a previously executed operation(s), which represent intermediate query results for a given query. The results of the previously executed operation(s) may correspond to an operation(s) included in a physical plan alternative of a query that references the cache object. A cache manager user has ownership privileges to each cache object in the cache registry in some configurations. By way of example, the cache manager user is an administrator account provided by the federated data system that manages each cache object in the cache registry and provides temporary access privileges to a cache object. More specifically, the cache manager user has a set of permissions that includes the ownership privileges to each cache object, and grants access to a cache object through a view for a user. A user associated with a given query therefore does not have ownership privileges to the cache objects in the cache registry.

In order to provide access to the cache object, the process 640 begins at 650 to create a view associated with a user for providing the results of executing the operation(s) as included in the cache object. Each cache object is protected because the cache manager user may control each view to the cache object for providing temporary access privileges to the cache object to the user.

The process 640 at 655 provides results of the executed operation(s) as included in the cache object in the created view to the user. In order to provide temporary access privileges to the cache object (e.g., due to the cache manager user's ownership of the cache object), the created view allows the user's query to access the cache object for collecting of results. At 660, the process 640 drops the view after providing results of the executed operation in the created view to the user. The process 640 then ends. The process 640 may be performed for each operation(s) that references a cache object in the physical plan alternative for executing the query.

Figure 6C:
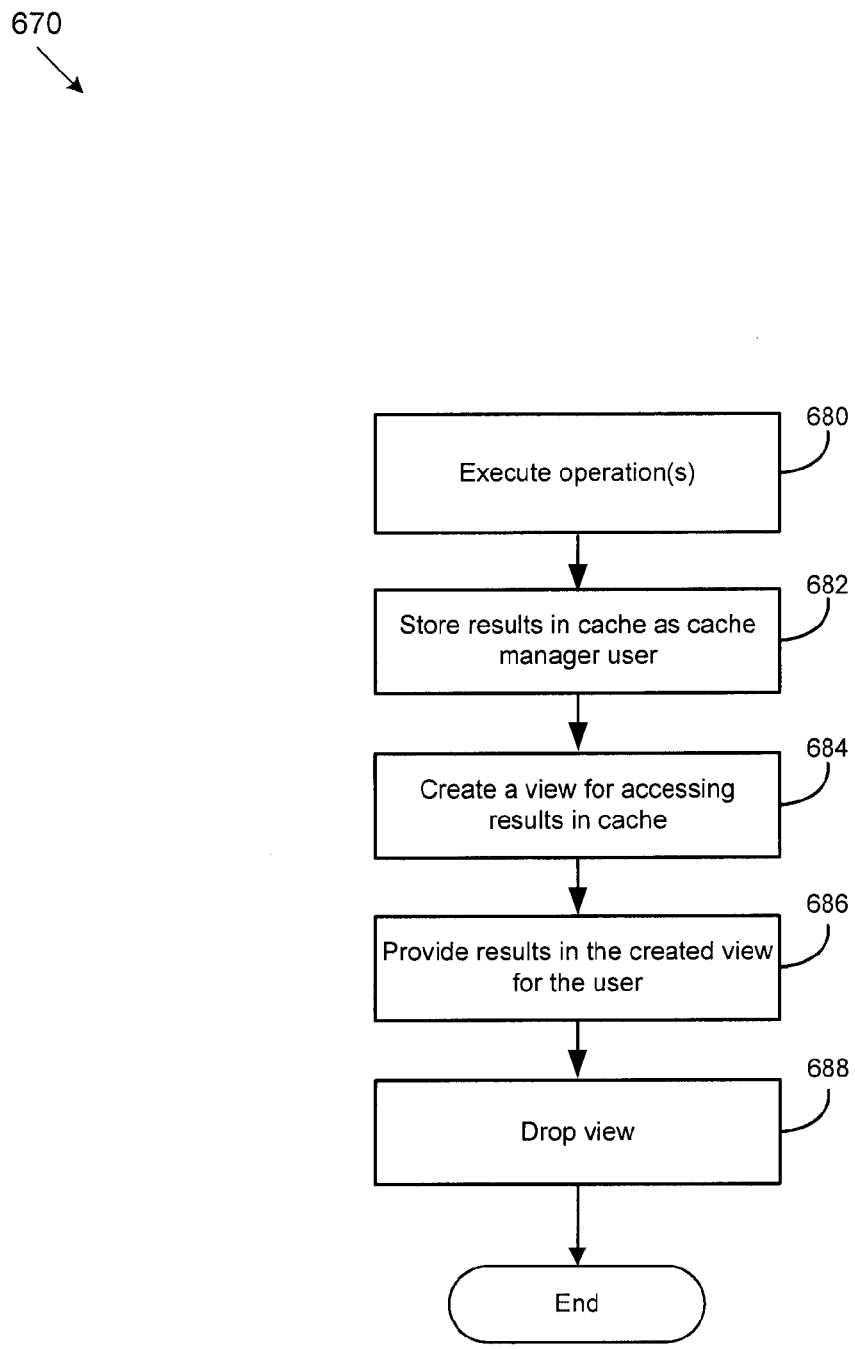
FIG. 6C conceptually illustrates an example process for storing intermediate query results as a cache object in a federated data system.

As part of executing one or more operations from a given query, FIG. 6C conceptually illustrates an example process for storing intermediate query results as a cache object in a federated data system. In some configurations, the process 670 may be implemented by one or more computing devices or systems. Although the example process 670 illustrated in FIG. 6C shows a linear execution of operations, it should be appreciated that any of the operations in FIG. 6C may be executed in a parallel manner and still be within the scope of the subject technology. In some configurations, the process 670 may be executed conjunctively with the process described in FIG. 5.

In some instances, as part of executing one or more operations of a given query (e.g., according to a physical plan alternative) for a user, results of the executed operation(s) may be stored as a cache object in the cache registry. The process 670 begins at 680 by executing an operation(s) from a query for a user. In one example, the operation may be executed according to a selected physical plan alternative associated with a logical plan alternative as described in FIG. 5.

At 682, the process 670 stores the results of the executed operation as a new cache object in the cache registry. In this regard, the new cache object may be stored in one of the data systems included in the federated data system. Ownership privileges to the new cache object are assigned to the cache manager user. In order to provide temporary access privileges to the new cache object (e.g., as the cache manager is the owner of the new cache object), the process 670 continues to 684 to create a view associated with the user that allows the user's query to access the new cache object for collecting results of the executed operation(s). The process 670 at 686 provides results of the executed operation(s) (as included in the new cache object) in the created view to the user. At 688, the process 670 drops the view after providing results of the executed operation(s) in the created view to the user. The process 670 then ends. The process 670 may be performed for each operation(s) in the physical plan alternative for executing the query (e.g., when a cache object corresponding to the operation is not found in the cache registry).

Figure 7:
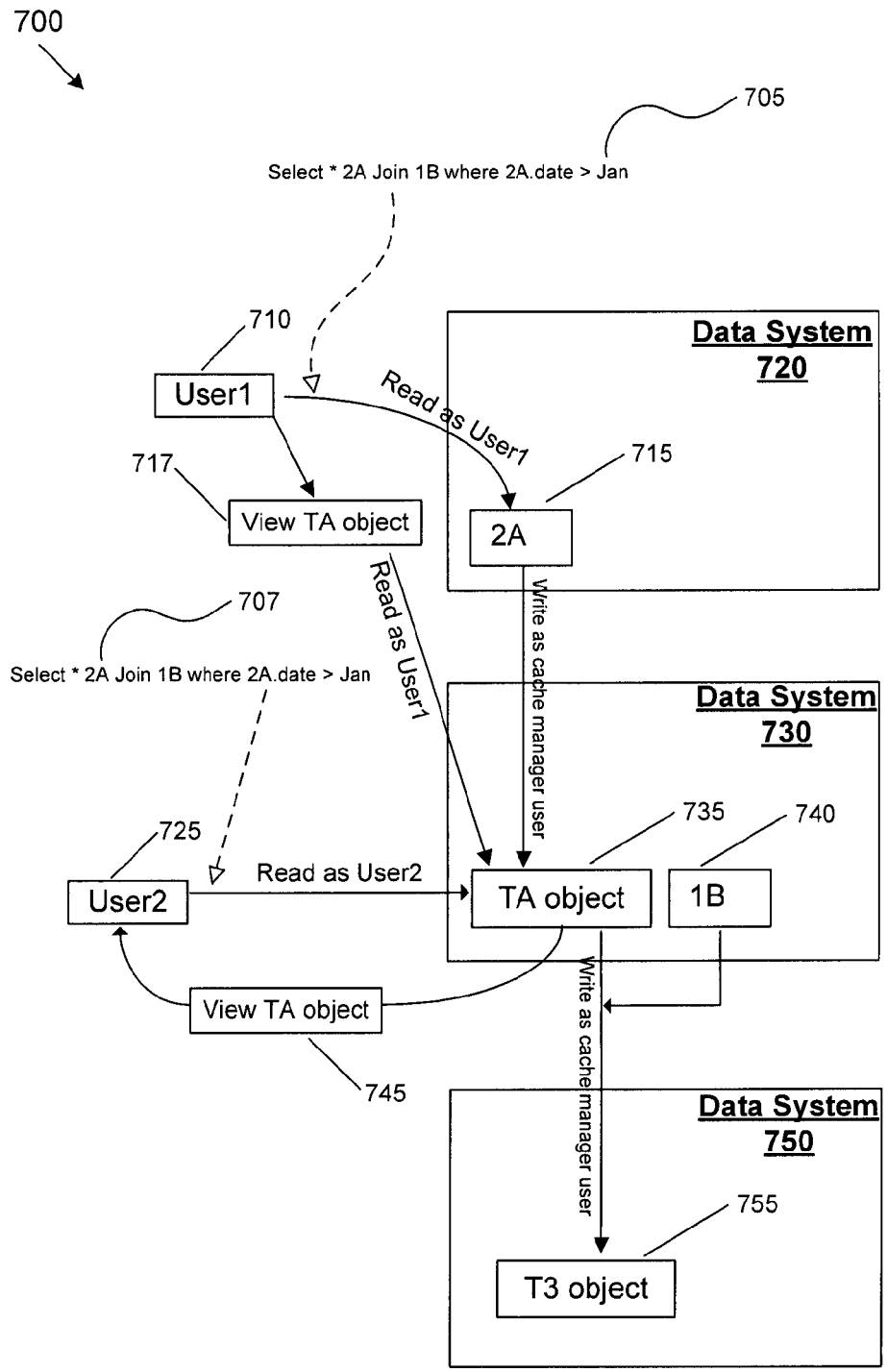
FIG. 7 conceptually illustrates an example system configuration for showing an example use case that implements a real-time security model for providing intermediate query results to a user in a federated data system.

FIG. 7 conceptually illustrates an example system configuration 700 for showing an example use case that implements a real-time security model for providing intermediate query results to a user in a federated data system. The real-time security model for providing intermediate query results to the user may be implemented as described in FIG. 6.

As shown in the example of FIG. 7, a federated data system includes data systems 720, 730 and 750. A query 705 (e.g., "Select*2A Join 1B where 2A.date>Jan") associated with a user 710 is received. In one example, an initial check is performed to determine if the user 710 has permission to perform a first operation from the query 705. The first operation in this example performs a read operation to the table 715 from the data system 720, and the user 710 has a set of permissions that includes read access to the table 715 from the data system 720. The user 710 then performs a first operation (e.g., "Select*2A") from the query 705 by accessing a table 715 ("Table 2A") from the data system 720. After receiving the results of the first operation, the results are written into a temporary table as a new cache object 735 ("TA object") in the data system 730. As illustrated, the results included in the cache object 735 are written as a cache manager user for storing in the data system 730. After being stored, the cache manager user now has ownership privileges to the cache object 735 from the data system 730. For providing the results of the first operation included in the cache object 735, a view 717 is created to include results of the first operation to the user 710. The view 717 is dropped after the results are provided to the user 710.

The user 710 then may perform a remaining set of operations from the query 705 by utilizing the cache object 735 and accessing a table 740 ("Table 1B") from the data system 730. Results of the remaining set of operations from the query 705 may then be stored in the data system 750 as a new cache object 755 ("T3 object"). The cache object 755 is written as the cache manager user for storing in the data system 750. The cache manager user now has ownership privileges to the cache object 755 from the data system 750. The results of the query 705 may then be returned to the user as included in the cache object 755.

As further illustrated in the example of FIG. 7, a second user 725 may submit an identical query 707 to the query 705 after the cache object 735 is stored in the data system 730. For the second user 725, a physical plan alternative that accesses the cache object 735 in the data system 730 may be provided as part of generating a set of physical plan alternatives (e.g., for a logical tree representation of the query) for a first operation from the query 707. Thus, the second user may be able to forgo executing the first operation from the query 707 since the results of the first operation are stored as the cache object 735 in the data system 730. However, the second user 725 may have a different set of permissions than the user 710 and the permissions of the second user 725 should be verified in order to determine if the second user 725 has access to one or more tables associated with the cache object 735. In one example, a check is performed to determine whether the second user 725 has permission to perform a first operation (e.g., "Select*2A") on the table 715 from the data system 720 as shown in the query 707. The second user 725 in this example has a set of permissions that includes read access to the table 715 from the data system 720 and thus may perform the first operation on the table 715. Once the permissions of the second user 725 have been verified, the second user 725 has been verified as having sufficient privileges to access the cache object 735. Next, a view 745 for the second user 725 is created for providing the results of the operation included in the cache object 735. After providing the results to the second user 725, the view 745 is dropped. In this manner, the federated data system is able to provide temporary access privileges to the cache object 735 via the view for the second user 725.

Many of the above-described features and applications are implemented as software processes that are specified as a set of instructions recorded on a machine readable storage medium (also referred to as computer readable medium). When these instructions are executed by one or more processing unit(s) (e.g., one or more processors, cores of processors, or other processing units), they cause the processing unit(s) to perform the actions indicated in the instructions. Examples of machine readable media include, but are not limited to, CD-ROMs, flash drives, RAM chips, hard drives, EPROMs, etc. The machine readable media does not include carrier waves and electronic signals passing wirelessly or over wired connections.

In this specification, the term "software" is meant to include firmware residing in read-only memory and/or applications stored in magnetic storage, which can be read into memory for processing by a processor. Also, in some implementations, multiple software components can be implemented as sub-parts of a larger program while remaining distinct software components. In some implementations, multiple software subject components can also be implemented as separate programs. Finally, a combination of separate programs that together implement a software component(s) described here is within the scope of the subject technology. In some implementations, the software programs, when installed to operate on one or more systems, define one or more specific machine implementations that execute and perform the operations of the software programs.

A computer program (also known as a program, software, software application, script, or code) can be written in a form of programming language, including compiled or interpreted languages, declarative or procedural languages, and it can be deployed in some form, including as a stand alone program or as a module, component, subroutine, object, or other unit suitable for use in a computing environment. A computer program may, but need not, correspond to a file in a file system. A program can be stored in a portion of a file that holds other programs or data (e.g., one or more scripts stored in a markup language document), in a single file dedicated to the program in question, or in multiple coordinated files (e.g., files that store one or more modules, sub programs, or portions of code). A computer program can be deployed to be executed on one computer or on multiple computers that are located at one site or distributed across multiple sites and interconnected by a communication network.

Some configurations are implemented as software processes that include one or more application programming interfaces (APIs) in an environment with calling program code interacting with other program code being called through the one or more interfaces. Various function calls, messages or other types of invocations, which can include various kinds of parameters, can be transferred via the APIs between the calling program and the code being called. In addition, an API can provide the calling program code the ability to use data types or classes defined in the API and implemented in the called program code.

The following description describes an example system in which aspects of the subject technology can be implemented.

Figure 8:
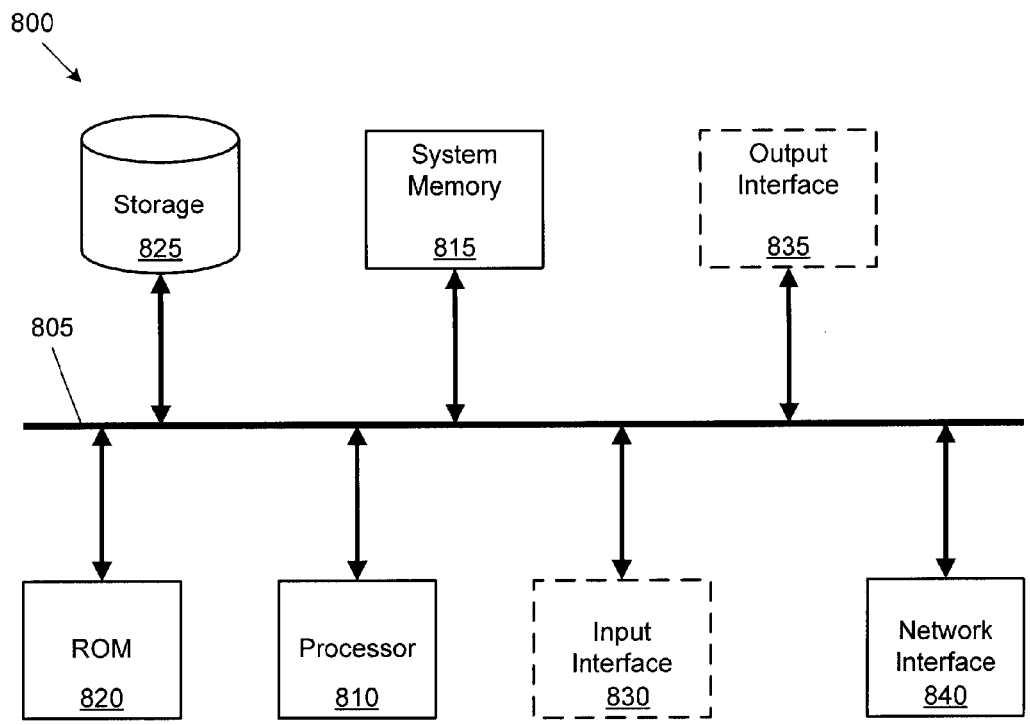
FIG. 8 conceptually illustrates a system with which some implementations of the subject technology may be implemented.

FIG. 8 conceptually illustrates a system 800 with which some implementations of the subject technology can be implemented. The system 800 can be a computer, phone, PDA, or another sort of electronic device. Such a system includes various types of computer readable media and interfaces for various other types of computer readable media. The system 800 includes a bus 805, processing unit(s) 810, a system memory 815, a read-only memory 820, a storage device 825, an optional input interface 830, an optional output interface 835, and a network interface 840.

The bus 805 collectively represents all system, peripheral, and chipset buses that communicatively connect the numerous internal devices of the system 800. For instance, the bus 805 communicatively connects the processing unit(s) 810 with the read-only memory 820, the system memory 815, and the storage device 825.

From these various memory units, the processing unit(s) 810 retrieves instructions to execute and data to process in order to execute the processes of the subject technology. The processing unit(s) can be a single processor or a multi-core processor in different implementations.

The read-only-memory (ROM) 820 stores static data and instructions that are needed by the processing unit(s) 810 and other modules of the system 800. The storage device 825, on the other hand, is a read-and-write memory device. This device is a non-volatile memory unit that stores instructions and data even when the system 800 is off. Some implementations of the subject technology use a mass-storage device (such as a magnetic or optical disk and its corresponding disk drive) as the storage device 825.

Other implementations use a removable storage device (such as a flash drive, a floppy disk, and its corresponding disk drive) as the storage device 825. Like the storage device 825, the system memory 815 is a read-and-write memory device. However, unlike storage device 825, the system memory 815 is a volatile read-and-write memory, such a random access memory. The system memory 815 stores some of the instructions and data that the processor needs at runtime. In some implementations, the subject technology's processes are stored in the system memory 815, the storage device 825, and/or the read-only memory 820. For example, the various memory units include instructions for processing multimedia items in accordance with some implementations. From these various memory units, the processing unit(s) 810 retrieves instructions to execute and data to process in order to execute the processes of some implementations.

The bus 805 also connects to the optional input and output interfaces 830 and 835. The optional input interface 830 enables the user to communicate information and select commands to the system. The optional input interface 830 can interface with alphanumeric keyboards and pointing devices (also called "cursor control devices"). The optional output interface 835 can provide display images generated by the system 800. The optional output interface 835 can interface with printers and display devices, such as cathode ray tubes (CRT) or liquid crystal displays (LCD). Some implementations can interface with devices such as a touchscreen that functions as both input and output devices.

Finally, as shown in FIG. 8, bus 805 also couples system 800 to a network interface 840 through a network adapter (not shown). In this manner, the computer can be a part of a network of computers (such as a local area network ("LAN"), a wide area network ("WAN"), or an Intranet, or an interconnected network of networks, such as the Internet. The components of system 800 can be used in conjunction with the subject technology.

These functions described above can be implemented in digital electronic circuitry, in computer software, firmware or hardware. The techniques can be implemented using one or more computer program products. Programmable processors and computers can be included in or packaged as mobile devices. The processes and logic flows can be performed by one or more programmable processors and by one or more programmable logic circuitry. General and special purpose computing devices and storage devices can be interconnected through communication networks.

Some implementations include electronic components, such as microprocessors, storage and memory that store computer program instructions in a machine-readable or computer-readable medium (alternatively referred to as computer-readable storage media, machine-readable media, or machine-readable storage media). Some examples of such computer-readable media include RAM, ROM, read-only compact discs (CD-ROM), recordable compact discs (CD-R), rewritable compact discs (CD-RW), read-only digital versatile discs (e.g., DVD-ROM, dual-layer DVD-ROM), a variety of recordable/rewritable DVDs (e.g., DVD-RAM, DVD-RW, DVD+RW, etc.), flash memory (e.g., SD cards, mini-SD cards, micro-SD cards, etc.), magnetic and/or solid state hard drives, read-only and recordable Blu-Ray® discs, ultra density optical discs, optical or magnetic media, and floppy disks. The computer-readable media can store a computer program that is executable by at least one processing unit and includes sets of instructions for performing various operations. Examples of computer programs or computer code include machine code, such as is produced by a compiler, and files including higher-level code that are executed by a computer, an electronic component, or a microprocessor using an interpreter.

While the above discussion primarily refers to microprocessor or multi-core processors that execute software, some implementations are performed by one or more integrated circuits, such as application specific integrated circuits (ASICs) or field programmable gate arrays (FPGAs). In some implementations, such integrated circuits execute instructions that are stored on the circuit itself.

As used in this specification and the claims of this application, the terms "computer", "server", "processor", and "memory" all refer to electronic or other technological devices. These terms exclude people or groups of people. For the purposes of the specification, the terms display or displaying means displaying on an electronic device. As used in this specification and the claims of this application, the terms "computer readable medium" and "computer readable media" are entirely restricted to tangible, physical objects that store information in a form that is readable by a computer. These terms exclude wireless signals, wired download signals, and other ephemeral signals.

To provide for interaction with a user, implementations of the subject matter described in this specification can be implemented on a computer having a display device, e.g., a CRT (cathode ray tube) or LCD (liquid crystal display) monitor, for displaying information to the user and a keyboard and a pointing device, e.g., a mouse or a trackball, by which the user can provide input to the computer. Other kinds of devices can be used to provide for interaction with a user as well; for example, feedback provided to the user can be a form of sensory feedback, e.g., visual feedback, auditory feedback, or tactile feedback; and input from the user can be received in a form, including acoustic, speech, or tactile input. In addition, a computer can interact with a user by sending documents to and receiving documents from a device that is used by the user; for example, by sending web pages to a web browser on a user's client device in response to requests received from the web browser.

Configurations of the subject matter described in this specification can be implemented in a computing system that includes a back end component, e.g., as a data server, or that includes a middleware component, e.g., an application server, or that includes a front end component, e.g., a client computer having a graphical user interface or a Web browser through which a user can interact with an implementation of the subject matter described in this specification, or a combination of one or more such back end, middleware, or front end components. The components of the system can be interconnected by a form or medium of digital data communication, e.g., a communication network. Examples of communication networks include a local area network ("LAN") and a wide area network ("WAN"), an internetwork (e.g., the Internet), and peer-to-peer networks (e.g., ad hoc peer-to-peer networks).

The computing system can include clients and servers. A client and server are generally remote from each other and typically interact through a communication network. The relationship of client and server arises by virtue of computer programs running on the respective computers and having a client-server relationship to each other. In some configurations, a server transmits data (e.g., an HTML page) to a client device (e.g., for purposes of displaying data to and receiving user input from a user interacting with the client device). Data generated at the client device (e.g., a result of the user interaction) can be received from the client device at the server.

It is understood that a specific order or hierarchy of steps in the processes disclosed is an illustration of example approaches. Based upon design preferences, it is understood that the specific order or hierarchy of steps in the processes can be rearranged, or that all illustrated steps be performed. Some of the steps can be performed simultaneously. For example, in certain circumstances, multitasking and parallel processing can be advantageous. Moreover, the separation of various system components in the configurations described above should not be understood as requiring such separation in all configurations, and it should be understood that the described program components and systems can generally be integrated together in a single software product or packaged into multiple software products.

The previous description is provided to enable a person skilled in the art to practice the various aspects described herein. Various modifications to these aspects will be readily apparent to those skilled in the art, and the generic principles defined herein can be applied to other aspects. Thus, the claims are not intended to be limited to the aspects shown herein, but is to be accorded the full scope consistent with the language claims, wherein reference to an element in the singular is not intended to mean "one and only one" unless specifically so stated, but rather "one or more." Unless specifically stated otherwise, the term "some" refers to one or more. Pronouns in the masculine (e.g., his) include the feminine and neuter gender (e.g., her and its) and vice versa. Headings and subheadings, if any, are used for convenience only and do not limit the subject technology.

A phrase such as an "aspect" does not imply that such aspect is essential to the subject technology or that such aspect applies to all configurations of the subject technology. A disclosure relating to an aspect can apply to all configurations, or one or more configurations. A phrase such as an aspect can refer to one or more aspects and vice versa. A phrase such as a "configuration" does not imply that such configuration is essential to the subject technology or that such configuration applies to all configurations of the subject technology. A disclosure relating to a configuration can apply to all configurations, or one or more configurations. A phrase such as a configuration can refer to one or more configurations and vice versa.

What is claimed is:

1. A computer-implemented method, the method comprising:
   receiving a query for data stored across a plurality of data systems, wherein the query is associated with a querying user;
   determining if the querying user has permission to access data in at least one table referenced in an operation from the query at a data system among the plurality of data systems, wherein permission is based on the data system checking an access control for the at least one table provided by the data system;
   determining a cache object corresponding to the operation from the query is present in a cache registry upon verification of permission for the querying user to access the data in the at least one table at the data system, wherein the cache object includes results of the operation executed from the query, and the cache object is owned by a cache manager user; and
   creating a view of the determined cache object associated with the querying user that provides temporary access privileges to the results of the executed operation in the determined cache object.

2. The method of claim 1, wherein the access control identifies if the querying user has permission to perform the operation on the at least one table at the data system.

3. The method of claim 1, wherein determining if the querying user has permission to access the data in the at least one table referenced in the operation is based on dynamic binding to verify permissions for each querying user that executes the operation.

4. The method of claim 1, further comprising:
dropping the view after providing the results of the operation in the created view to the querying user.

5. The method of claim 1, wherein the cache manager user comprises an administrator account.

6. The method of claim 1, wherein the view is controlled by the cache manager user.

7. The method of claim 1, further comprising:
executing the operation to provide results of the executed operation if the operation does not correspond to any existing cache object in the cache registry; and
storing a new cache object including the results of the executed operation in the cache registry.

8. The method of claim 7, wherein the stored cache object is owned by the cache manager user.

9. The method of claim 1, further comprising:
invalidating the existing cache object in the cache registry.

10. The method of claim 1, wherein the querying user does not have ownership privileges to the cache object.

11. The method of claim 1, wherein the cache object is utilized as a physical plan alternative for one or more operations of a respective query.

12. The method of claim 1, wherein determining if the querying user has permission to access the data in the at least one table referenced in the operation from the query occurs in real-time.

13. The method of claim 1, wherein the plurality of data systems store federated data.

14. A system, comprising:
one or more processors;
a machine-readable medium comprising instructions stored therein, which when executed by the one or more processors, cause the processors to perform operations comprising:
receiving a query for data stored across a plurality of data systems, wherein the query is associated with a querying user;
determining if the querying user has permission to access data in at least one table referenced in an operation from the query at a data system among the plurality of data systems, wherein permission is based on the data system checking an access control for the at least one table provided by the data system;
determining a cache object corresponding to the operation from the query is present in a cache registry upon verification of permission for the querying user to to access the data in the at least one table at the data system, wherein the cache object includes results of the operation executed from the query, and the cache object is owned by a cache manager user; and
creating a view of the determined cache object associated with the querying user that provides temporary access privileges to the results of the executed operation in the determined.

15. The system of claim 14, wherein the access control identifies if the querying user has permission to perform the operation on the at least one table at the data system.

16. The system of claim 14, further comprising:
dropping the view after providing the results of the operation in the created view to the querying user.

17. The system of claim 14, further comprising:
executing the operation to provide results of the executed operation if the operation does not correspond to any existing cache object in the cache registry; and
storing a new cache object including the results of the executed operation in the cache registry.

18. A non-transitory machine-readable medium comprising instructions stored therein, which when executed by a machine, cause the machine to perform operations comprising:
receiving a query for data stored across a plurality of data systems, wherein the query is associated with a querying user;
determining if the querying user has permission to access data in at least one table referenced in an operation from the query at a data system among the plurality of data systems, wherein permission is based on the data system checking an access control for the at least one table provided by the data system;
determining a cache object corresponding to the operation from the query is present in a cache registry upon verification of permission for the querying user to access the data in the at least one table at the data system, wherein the cache object includes results of the operation executed from the query, and each cache object is owned by a cache manager user;
providing the cache object for including in a view in response to determining the cache object is present in the cache registry;
creating a view of the determined cache object associated with the querying user that provides temporary access privileges to the results of the executed operation in the determined cache object;
and
dropping the created view after providing the results of the executed operation in the created view.

* * * * *